3,660,349
DISPERSANTS FOR ORGANIC SOLVENT SYSTEMS
Thomas D. Mutaffis, Springfield, Leon Katz, Midland
Park, and Frederick Grosser, North Plainfield, N.J.,
assignors to General Aniline & Film Corporation, New
York, N.Y.
No Drawing. Continuation of application Ser. No.
610,240, Jan. 19, 1967. This application Feb. 25,
1970, Ser. No. 14,756
Int. Cl. C08f 45/04, 45/14, 48/28
U.S. Cl. 260—41                                4 Claims

ABSTRACT OF THE DISCLOSURE

This invention is directed to a free-flowing colorant paste dispersion of high solids comprising a colorant, preferably oil-soluble pigments or dyestuffs, and as the dispersant, an alkylated polymer of a heterocyclic N-vinyl monomer and a hydrocarbon liquid medium having a Kauri Butanol Value of less than about 45.

This application is a continuation of application Ser. No. 610,240, filed on Jan. 19, 1967, now abandoned.

BACKGROUND OF THE INVENTION

This invention relates to novel and useful colorant paste dispersions of high solids and more particularly to free-flowing paste dispersions of high solids comprising a colorant, a dispersant and an organic liquid.

While the metering of colorant compositions of high solids into bulk systems such as fuels, for example, gasoline, fluid insecticide preparations, printing ink compositions and other such liquid compositions for protective or decorative purposes is very desirable and not in itself novel, many disadvantages have yet to be overcome. Among the draw-backs encountered, have been the necessity to utilize organic mediums which are very effective solvents for the colorant and which are often very costly. Moreover, the use of such solvents not only limits the type of colorant that may be utilized, but must be so chosen that it does not adversely affect the bulk system into which it is metered. Attempts to overcome these problems by using organic mediums which are nonsolvents for the colorants, have only resulted in paste dispersions which are of a thick semi-dry non-flowing nature and generally contain undesirable colorant grains, particles or agglomerates in the final preparation. Moreover, such thick non-flowing high solids colorant dispersions are extremely difficult to meter into bulk systems. Consequently compromises have often had to be made by foregoing the more preferred high solids dispersion for a low solids dispersion thereby sacrificing color strength as well as adding to the problems involved with transportation and storage facilities.

SUMMARY OF THE INVENTION

We have now discovered that the above problems and difficulties may be overcome by our novel non-solvent type liquid colorant systems of high solids. Applicants have surprisingly discovered that by utilizing a dispersant, as defined below, a colorant high solids liquid system may be obtained which has the nature of a free-flowing paste, even though the colorant is not soluble in the organic liquid. This is indeed surprising since the same colorant high solids liquid system minus the dispersant is in the form of a thick semi-dry non-flowing paste due to the non-solubility of the colorant in the organic medium.

Therefore, it is an object of this invention to provide high solids liquid systems, i.e., colorant paste dispersions of high solids comprising a colorant, a dispersant and an organic liquid, said organic liquid by itself being a non-solvent for the colorant or at least one in which the pigment is only slightly soluble. It is also an object of this invention to provide a free-flowing colorant dispersion of high solids. It is a further object of this invention to provide free-flowing colorant dispersions of high solids suitable for metering the colorants into fluid bulk systems. Other objects and advantages will become manifested by the following description and claims.

The attainment of the above objects is made possible by the instant invention which consists of a novel free-flowing colorant dispersion of high solids comprising a colorant, a dispersant and an organic liquid medium. More specifically, the invention may be described as free-flowing colorant paste dispersions of high solids comprising a colorant, selected from the group consisting of inorganic pigments, organic pigments and dyestuffs, and as the dispersant, an alkylated polymer of a heterocyclic N-vinyl monomer in which the alkyl radical of said polymer contains from 2 to 2000 carbon atoms, and an hydrocarbon liquid having a Kauri-butanol value of less than about 45 to serve as the organic medium.

DESCRIPTION OF THE PREFERRED EMBODIMENTS

The manner in which the instant high solids colorant paste dispersions are prepared, i.e. the order in which the components are mixed is not in any way critical, since they need only be thoroughly mixed together in any conventional manner so that the colorant is dispersed throughout the organic medium.

Colorants suitable for use in the instant compositions of this invention include both inorganic pigments such as titanium oxide, carbon black, chrome yellow, ultra marine blue, lithophone, oxide yellow and the like, as well as organic pigments and dyestuff compounds, such as phthalocyanine greens, phthalocyanine blues, carmine red and oil soluble colors such as Sudan colors, for example, Sudan Blue GA, Sudan Orange RA, Anthraquinone Red MR and the like, as well as mixtures thereof. These pigments are available normally in finely divided form obtained for example, by precipitation from solution, pulping, acid pasting, and finally grinding in dry form. Dry powdered pigments thus obtained are in a substantially uniform fine state of subdivision.

Among the more preferred colorants that may be mentioned are the oil soluble pigments and dyestuffs. Such oil soluble colorants may be found more fully described in "The Chemistry of Synthetics Dyes and Pigments" by Lubs (1955) at pages 174–179 and 611–612, said disclosure being incorporated herein by reference. Among the more common oil soluble colorants that may be mentioned are Oil Yellow, Oil Red, Yellow AB, as well as all of the Sudan colors such as Sudan Blue GL, Sudan Orange, Sudan Red G, Sudan Brown 5B, Sudan Yellow 3GN, Sudan Violet R, Sudan Green BB, etc. Other oil soluble colorants include the water-insoluble amine salts of acid and direct dyes, such as Zapon Fast Scarlet CG, Calco Fast Spirit Black R as well as the water-insoluble amine salts of such colorants as Acid Yellow, Acid Blue, Acid Orange, Direct Blue, Direct Red, Direct Yellow II, Solvent Red and the like.

In accordance with the present invention, alkylated polymers of heterocyclic N-vinyl monomers are utilized as the dispersants. These dispersants are those prepared by alkylation of a homopolymer or copolymer of a heterocyclic N-vinyl monomer, preferably a N-vinyl lactam monomer and most preferably N-vinyl pyrrolidone monomer with an alpha-olefin containing from 2 carbon atoms to 2000 carbon atoms, preferably in the range of from 2 to 200 carbon atoms, and most preferably in the range of from 8 to 42 carbon atoms, said alkylation process being more fully described in General Aniline & Film Corporation's co-pending patent application, Ser. No. 508,547, filed Nov. 18, 1965, or by simultaneously polymerizing and alkylating a mixture containing a heterocyclic N-vinyl monomer, a monoethylenically unsaturated polymerizable monomer and an alpha-olefin containing from 2 carbon atoms to 2000 carbon atoms or a mixture of the same or two different heterocyclic N-vinyl monomers and an alpha-olefin containing from 2 carbon atoms to 2000 carbon atoms, said simultaneous polymerization and alkylation process being more fully described in General Aniline and Film Corporation's copending patent application, Ser. No. 525,374, filed Feb. 7, 1966.

As examples of heterocyclic N-vinyl monomers which contain a carbonyl function adjacent to the nitrogen in the heterocyclic moiety, whose alkylated polymeric derivatives produced as described in said applications, Ser. Nos. 508,547 and 525,374, may be employed in practicing the present invention, that may be mentioned are N-vinyl succinimide, N-vinyl diglycolylimide, N-vinyl glutarimide, N-vinyl-3-morpholinone, N-vinyl-5-methyl-3-morpholinone, N-vinyl-5-ethyl3-morpholinone, N-vinyl oxazolidone, etc., and N-vinyl ringoxygenated lactams as disclosed in U.S. Pat. 3,231,548, and especially the N-vinyl 5-, 6- and 7-membered lactams, particularly N-vinyl pyrrolidone, characterized by the following formula:

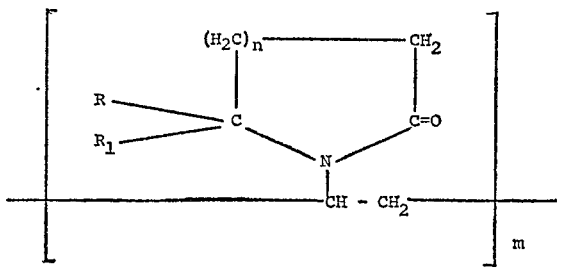

wherein R and $R_1$ are selected from the group consisting of hydrogen, methyl and ethyl, $n$ is an integer of from 1 to 3, and $m$ represents the average molecular weight as determined by relative viscosity measurements which are designated as K values.

The viscosity coefficient, K, which is fully described in Modern Plastics, vol. 23, No. 3, pp. 157–61, 212, 214, 216 and 218 (1945) is calculated as follows:

$$\frac{\log \eta_{rel}}{c} = \frac{75K_o^2}{1+1.5K_{oo}} + K_o$$

and $$K = 1000\ K_o$$

where $c$ is the concentration in grams per 100 ml. of polymer in solution and the $\eta_{rel.}$ is the viscosity of the solution compared to solvent.

There may also be used the alkylated polymers of comparable monomers of N-vinyl 5-, 6- and 7-membered thiolactams, N-acryloylpyrrolidone, -piperidone and -caprolactam; N-acryloyl-5-methyl-pyrrolidone, N-acryloyl-6-methyl piperidone and N-acryloyl-7-methyl caprolactam and their corresponding 5-, 6- and 7-ethyl derivatives; N-acryloxy-methyl-pyrrolidone, -piperidone and -caprolactam; N-methacryloxy-ethyl-pyrrolidone, -piperidone and -caprolactam; N-methacryloxy-methyl-5-methyl pyrrolidone, -6-methyl-piperidone and -7-methyl-caprolactam; N-methacrylamido-methyl-, N-methacrylamidoethyl-, N-methacrylamidopropyl- and N-(N-phenylacrylamidopropyl)-pyrrolidones, -piperidones and caprolactams.

The homopolymers of the N-vinyl lactams characterized by the foregoing formula (whose alkylated derivatives obtained, for example, as described in said application Ser. No. 509,547, are suitable for use in practicing the present invention) are readily obtained by homopolymerizing N-vinyl pyrrolidone; N-vinyl-5-methyl pyrrolidone; N-vinyl-5-ethyl pyrrolidone; N-vinyl-5,5-dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl-7-methyl-7-ethyl caprolactam.

For the purpose of the present invention we employ alkylated derivatives of homopolymers of heterocyclic N-vinyl monomers having a K value ranging from about 10 to 140, preferably from about 30 to 100. These homopolymers are readily obtained by conventional homopolymerizate procedures of the foregoing heterocyclic N-vinyl monomers described in United States Pats. 2,265,450; 2,317,804; 2,335,454 and many others too numerous to mention in which working examples are given.

Copolymers obtained by copolymerizing 5 to 99 mole percent of the foregoing heterocyclic N-vinyl monomers with 1 to 95 mole percent of a monoethylenically unsaturated polymerizable monomer and having a K value from about 10 to 140 are readily alkylated in accordance with the present invention to yield products having solubility characteristics dictated by the end use.

The various monoethylenically unsaturated polymerizable monomers, which are copolymerized with any one of the aforementioned heterocyclic N-vinyl monomers in the conventional manner and which will yield copolymers that are readily alkylated in accordance with said application, Ser. No. 508,547, to produce alkylated copolymers suitable for use in practicing the present invention, include vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile; vinyl ketones; vinyl cyclohexane; styrene; 2-vinyl pyridine, 4-vinyl pyridine; acrylic acid; acrylate ester monomers of the formula:

wherein $R_2$ represents either a straight or branched alkyl of from 1 to 18 carbon atoms or an alkoxyalkyl in which the total number of carbon atoms in the alkyl groups range from 3 to 6.

As examples of such acrylate esters the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethyl-hexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxy ethyl methacrylate, α-phenyl ethyl methacrylate, phenyl methacrylate, o-cresol methacrylate, p-cyclohexylphenyl methacrylate, 2-nitro-2-methyl propyl methacrylate, diethylaminoethylmethacrylate, ethylidene acetate methacrylate and glycidyl methacrylate, including esters of halo acrylic acids, such as methyl-2-chloro-acrylate, ethyl-α-chloro-acrylate, phenyl-α-chloro-acrylate, α-ethyl-acrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N-N-di-n-butyl acrylamide, N-N-di-isobutyl acrylamide, N-cyclohexyl acrylamide, N-N-dicyclohexyl acrylamide, N-phenyl acrylamide, N-p-nitro-phenyl acrylamide, N-α-naphthyl acrylamide, N-β-naphthyl acrylamide, N-methyl-N-phenyl acrylamide, N,N-diphenyl acrylamide, N-benzyl acrylamide, N,N-di-benzyl acrylamide; and grafted monomers of the type disclosed in U.S. Pats. 3,029,219; 3,035,009; 2,036,033 and the like.

A mixture consisting of from 5 to 99 mole percent of anyone of the foregoing heterocyclic N-vinyl monomers and from 1 to 95 mole percent of a different heterocyclic N-vinyl monomer, such as for example, N-vinyl lactam with either N-vinyl succinimide, N-vinyl-3-morpholinone, and the like, may also be copolymerized and the resulting copolymer alkylated for use in the present invention.

From numerous experiments connected with the present invention, it has been found that the configuration of the foregoing monoethylenically unsaturated monomers, and numerous others, is immaterial since they all copolymerize in the aforementioned proportions with the heterocyclic N-vinyl monomers and yield copolymers which are soluble in the organic solvent or mixture thereof and which are readily alkylated.

With regard to the α-olefins employed for producing the alkylated polymers used in practicing this invention, it is to be noted at the outset that any α-olefins having a molecular weight from about 28 to as high as about 28,000, may be employed as the alkylating agent for the alkylated polymers of the various heterocyclic N-vinyl monomers. As examples of such α-olefins, the following are illustrative: ethylene, propylene, 1-butene, 1-pentene, 2-ethyl-1-butene, 2-methyl-1-pentene, 1 hexene, 5-methyl-1-hexene, 2-methyl-1-pentene, 3-ethyl-1-pentene, 1-heptene, 1-octene, 1-nonene, 2-ethyl-1-hexene, 1-decene, 1-dodecene, 1-tetradecene, 1-hexadecene, 1-heptadecene, 1-octadecene, 1-nonadecene, 1-eicosene, 1-docosene, 1-tetracosene, 1-pentacosene and polybutenes of molecular weight of 400 to 2500 may be employed.

While linear α-olefins are preferred because of their commercial availability, numerous isomers of α-olefins ranging from 1-pentene to 1-pentacosene as well as polybutenes may also be employed in the alkylation reaction. The only requirement in such case is that the isomer contained in ethylenic unsaturation in the α position thereof.

Instead of employing any one of the foregoing individual α-olefins, a mixture of commercially available linear α-olefins produced by cracking petroleum wax or by polymerizing lower olefins may also be used as the alkylating agent. Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and may be used. A mixture of α-olefins containing from 65 to 75 percent of α-olefins of from $C_{20}$ to $C_{42}$ carbon atoms having an average molecular weight of 366 is also commercially available and such mixture is employed in the alkylation reaction.

The quantity of such alkylated polymers of heterocyclic N-vinyl monomers employed for a given amount of a colorant is not critical and need be only sufficient to deflocculate colorant agglomerates and disperse the colorant in the organic medium in which the colorant is to be suspended. Quantities of said alkylated polymers used in excess of the aforesaid minimum are not critical, but for the purpose of convenience and economy, the amounts generally employed advantageously range from 0.01 to 2–3 times the weight of the colorant and preferably range from about 1 to 100 parts, especially about 10 parts, per 100 parts of the colorant.

The organic liquids suitable for use in the instant invention are those hydrocarbon liquids in which the colorants are not soluble or at least very difficultly soluble. These liquids may be characterized as hydrocarbon liquids having low Kauri-butanol values, preferably about 45 and below. Such hydrocarbons are well known and include such liquids as naphthas, kerosenes, mineral spirits, Isopars, cycloalkanes and aliphatic hydrocarbons or mixtures thereof and the like. Among some of the more preferred liquid hydrocarbons that may be mentioned are those listed in the following table along with their approximate Kauri butanol values:

| Trade name: | Kauri butanol value |
| --- | --- |
| Amsco Pentane | 26.0 |
| Amsco Hexane | 30 |
| Skellysolve C | 36.0 |
| Chevron Heptane | 30 |
| Amsco Lactol Spirits | 43 |
| Ess VM&P Naptha (BTN) Humble (EE) (SEE) | 38 |
| Amsco Textile Spirits | 35.2 |
| Skellysolve H | 33 |
| Esso Solvent #5 Humble (EE) SEE) | 37 |
| Amsco Iso-Octane | 28 |
| Isopar E | 29 |
| Amsco Special Naphtholite | 41 |
| Amsco Mineral Spirits | 27 |
| Isopar H | 27 |
| Isopar K | 27 |
| Isopar L | 26.9 |
| Isopar M | 26 |
| Amsco Ink Oil 10–600 | 26.2 |

The amount of colorant high solids in the final paste dispersions of course will be decided only by the color strength desired or dictated by the particular ultimate use intended for the colorant dispersion. By the term, "high solids," as used in this application, applicants mean free-flowing paste dispersions containing colorants in the amount of about 10% to about 65%, preferably about 30% to about 65% by weight.

The following examples are illustrative of the present invention and are not to be regarded as limitative. It is to be understood that all parts, percentages and proportions referred to herein and in the appended claims are by weight unless otherwise indicated.

EXAMPLE I

A high solids colorant paste dispersion was prepared by charging 25 g. of Sudan Orange RA, 22.5 g. of Isopar H (an aliphatic hydrocarbon liquid) and 2.5 g. of alkylated polyvinyl pyrrolidone, obtained by simultaneously alkylating and polymerizing one mole of N-vinyl pyrrolidone and one mole of α-eicosene, to a ball mill. Said composition was thoroughly mixed by allowing the ball mill to run overnight. The resultant product was a free-flowing paste dispersion of high solids free from colorant agglomerates and contained about 50% of colorant by weight.

EXAMPLE II

The procedure in Example I was repeated except that Anthraquinone Red MR was employed as the colorant instead of Sudan Orange RA and a similar free-flowing paste dispersion was obtained.

EXAMPLE III

The procedure in Example I was repeated except that Sudan Blue GA was employed as the colorant instead of Sudan Orange RA and a similar free-flowing paste dispersion was obtained.

EXAMPLE IV

Additional paste dispersions were prepared by following the procedure of Example I except that different alkylated polyvinyl pyrrolidone dispersants were used, obtained by employing other olefins instead of α-eicosene such as a mixture of $C_{16}$ to $C_{20}$ α-olefins and a mixture of $C_{18}$ to $C_{20}$ α-olefins with like results. The resultant products were free-flowing paste dispersions.

EXAMPLE V

A control experiment was carried out by repeating the procedure of Example I employing 50 parts of Sudan Orange RA and 50 parts of Isopar H but omitting the dispersant. The resultant product was a non-flowing thick semi-dry paste in contrast to the free-flowing paste dispersion obtained in Example I.

EXAMPLE VI

A high solids colorant paste dispersion was prepared by following the procedure of Example I, employing 120 parts of Sudan Orange RA, 268 parts of Isopar H and 12 parts of an alkylated polyvinyl pyrrolidone obtained by simultaneously alkylating and polymerizing one mole of N-vinyl pyrrolidone and one mole of a mixture of $C_{20}$ α-olefins. The resultant water thin product was a free-flowing paste dispersion of high solids free from colorant agglomerates and contained about 30% of colorant by weight.

A control experiment was carried out following the same procedure using 120 parts of Sudan Orange RA and 280 parts of Isopar H, but omitting the polymer dispersant. The resultant product obtained was in the form of a solid paste, with no fluidity.

EXAMPLE VII

A high solids colorant paste dispersion was prepared by following the procedure of Example I, employing 30 parts of Sudan Orange RA, 60 parts of Amsco Mineral Spirits and 10 parts of an alkylated polyvinyl pyrrolidone obtained by simultaneously alkylating and polymerizing N-vinyl pyrrolidone and a mixture of $C_{20}$ α-olefins. The resultant product exhibited a water thin viscosity and was a free-flowing paste dispersion of high solids free from colorant agglomerates and contained about 30% of colorant by weight.

A control experiment was carried out following the same procedure using 30 parts of Sudan Orange RA and 70 parts of Amsco Mineral Spirits, but omitting the dispersant. The resultant product obtained was of a stiff paste consistency with no fluidity.

EXAMPLE VIII

The procedure of Example VII was repeated except that Amsco Ink-Oil #10–600 was employed as the hydrocarbon liquid medium instead of Amsco Mineral Spirits and substantially similar results were obtained. The paste dispersion containing the dispersant was water-thin and free-flowing while the control paste dispersion minus the dispersant was a stiff paste with no fluidity.

EXAMPLE IX

A high solids colorant paste dispersion was prepared by following the procedure of Example VII employing 60 parts of Sudan Orange RA; 30 parts Isopar H and 10 parts of an alkylated polyvinyl pyrrolidone obtained by simultaneously alkylating and polymerizing N-vinyl pyrrolidone and a mixture of $C_{20}$ α-olefins. The resultant product although fairly viscous and quite tacky, was still a free-flowing fluid paste dispersion of high solids and contained about 60% of colorant by weight.

EXAMPLE X

A high solids colorant paste dispersion was prepared by following the procedure of Example VII, employing 65 parts of Sudan Orange RA; 25 parts Isopar H and 10 parts of an alkylated polyvinyl pyrrolidone obtained by simultaneously alkylating and polymerizing N-vinyl pyrrolidone and a mixture of $C_{20}$ α-olefins. The resultant product, although fairly viscous and quite tacky, was still a free-flowing fluid paste dispersion of high solids and contained about 65% of colorant by weight.

As examples of other colorants that may be substituted for the colorants in the above examples and yield like results are Oil Yellow, Oil Red, Sudan Red G, Sudan Yellow 3GN, Sudan Green BB, Zapon Fast Scarlet CG, the water-insoluble amine salts of such colorants as Acid Yellow or Orange and Direct Blue or Red, Phthalocyanine Blue, Phthalocyanine Green, Milori Blue, Para Red, Toluidine Red, Dioxazine Violet, Chlorinated Isoviolanthrone, Lithol Red 2G, Chrome Green, carmine azo pigment from coupling o-anisidine-5-sulfondiethylamide with 2 - hydroxy-3-naphthoic acid -5'chloro-2',4'-dimethoxyanilide, yellow condensation products of 2-hydroxynaphthaldehyde with hydrazine, Lemon Ochre (ferric oxide), chlorinated and bromoinated derivatives of copper Phthalocyanine Blue, red azo pigment from coupling tetrazotized dianisidine with 1 - phenyl-3-methylpyrazolone-5, yellow monoazo pigment from coupling diazotized p-chloro-o-nitraniline with acetoacet-o-chloroanilide, orange diazo pigment from coupling tetraozotized 2,2'-dichlorobenzidine with 1-phenyl-3-methylpyrazolone-5, red barium lake of azo dye from coupling diazotized m-toluidine-sulfoacid with beta-naphthol, Pigment Orange (lead chromate molybdate), carbon blacks with titanium dioxides.

Other alkylated polymers that may be substituted for the alkylated polymers utilized in the above examples as the dispersant and yield like results are such alkylated polymers as N-vinyl pyrrolidone K–90 alkylated with 1-decene, ethylene, 1-butene, 1-octene, 1-dodecene, 1-tetradecene, 1-hexadecene, α-octadecene, α-eicosene or Chevron (a mixture of $C_{12}$–$C_{29}$ α-olefins) and the like; N-vinyl piperidone alkylated with 1-dodecene; a copolymer of N-vinyl piperidone (70%)/vinyl acetate (30%) alkylated with 1- eicosene; N-ϵ-caprolactam alkylated with 1-hexadecene; copolymer of N-vinyl-ϵ-caprolactam (80%)/ethyl acrylate (20%) alkylated with 1-dodecene; N-vinyl pyrrolidone K–30 alkylated with a mixture of α-olefins containing from 65 to 75% of $C_{22}$–$C_{42}$ carbon atoms having an average molecular weight of 395; as well as alkylated polymers formed by simultaneously polymerizing and alkylating N-vinyl pyrrolidone and hexadecene or octadecene and the like; N-vinyl-2-pyrrolidone, dimethylaminoethylmethacrylate, and α - eicosene; N-vinyl-2-piperidone, N-vinyl-3-morpholinone and α-octadecene; and N-vinyl caprolactam, ethyl acrylate and α-dodecene.

Other hydrocarbon liquids that may be utilized in the above examples and employed as the organic medium with like results are Amsco Pentane, Amsco Hexane, Skellysolve C, Chevron Heptane, Amsco Lactol Spirits, Esso VM&P Naphtha (BTN) Humble (EE) (SEE), Amsco Textile Spirits, Skellysolve H, Esso Solvent #5 Humble (EE) (SEE), Amsco Iso-Octane, Isopar E, Amsco Special Naphtholite, Amsco Mineral Spirits, Isopar K, Isopar K, Isopar L, Isopar M, and Amsco Ink Oil 10–600.

Various modifications and variations of this invention will be obvious to a worker skilled in the art and it is understood that such modifications and variations are to be included within the purview of this application and the spirit and scope of the appended claims.

What is claimed is:

1. A free-flowing colorant paste dispersion of high solids comprising a colorant selected from the group consisting of inorganic pigments, organic pigments and dyestuffs; and as the dispersant, an alkylated polymer of a heterocyclic N-vinyl monomer in which the alkyl radical of said polymer contains from 2 to 2000 carbon atoms; and a hydrocarbon liquid medium having a Kauri Butanol Value of less than about 45; the ratio of alkylated polymer to colorant being in the range of from about 0.01 to about 3% by weight of said alkylated polymer to 1% by weight of colorant, said colorant being present in an amount of from about 10 to about 65% by weight.

2. A free-flowing pigment paste dispersion as defined in claim 1, wherein the alkyl radical of said polymer contains at least 8 to 42 carbon atoms.

3. A free-flowing pigment paste dispersion as defined in claim 2, wherein the alkylated polymer is an alkylated polymer of an N-vinyl pyrrolidone monomer.

4. A free-flowing colorant paste dispersion of high solids as defined in claim 1, wherein the colorant is selected from the group consisting of oil soluble pigments and oil soluble dyestuffs.

References Cited

UNITED STATES PATENTS

| | | | |
|---|---|---|---|
| 3,249,454 | 5/1966 | Williams | 106—308 N |
| 3,417,054 | 12/1968 | Merijan et al. | 260—66 |
| 3,423,367 | 1/1969 | Merijan et al. | 260—66 |

MORRIS LIEBMAN, Primary Examiner

J. H. DERRINGTON, Assistant Examiner

U.S. Cl. X.R.

260—41